June 28, 1966   R. R. PETERSON   3,257,826
FLEXIBLE COUPLING

Filed July 27, 1965   3 Sheets-Sheet 1

INVENTOR.
Robert R. Peterson
BY
Ralph Hammar
attorney

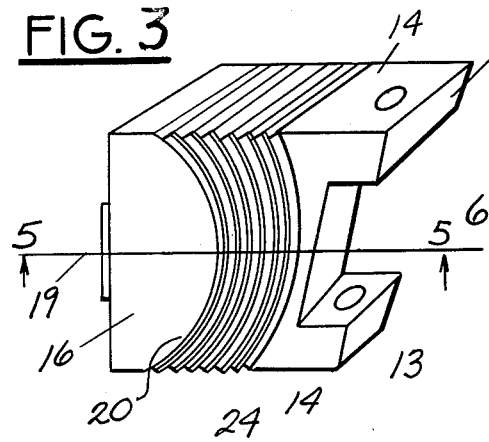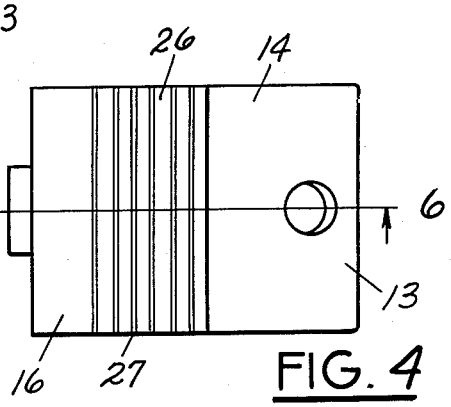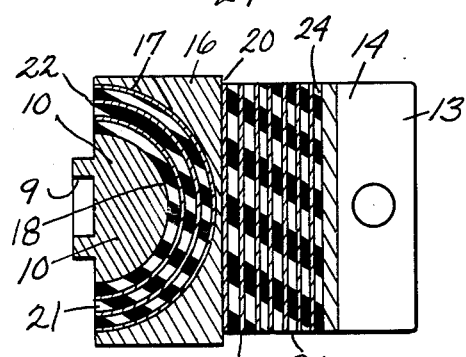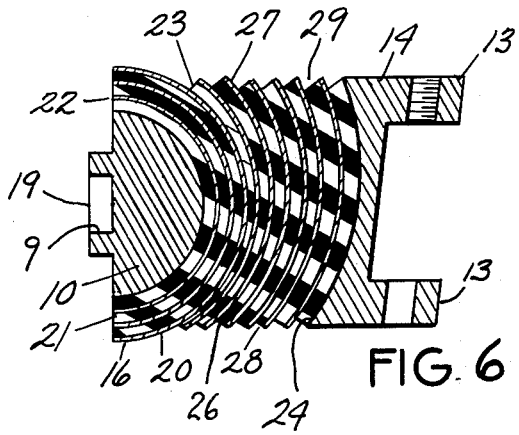

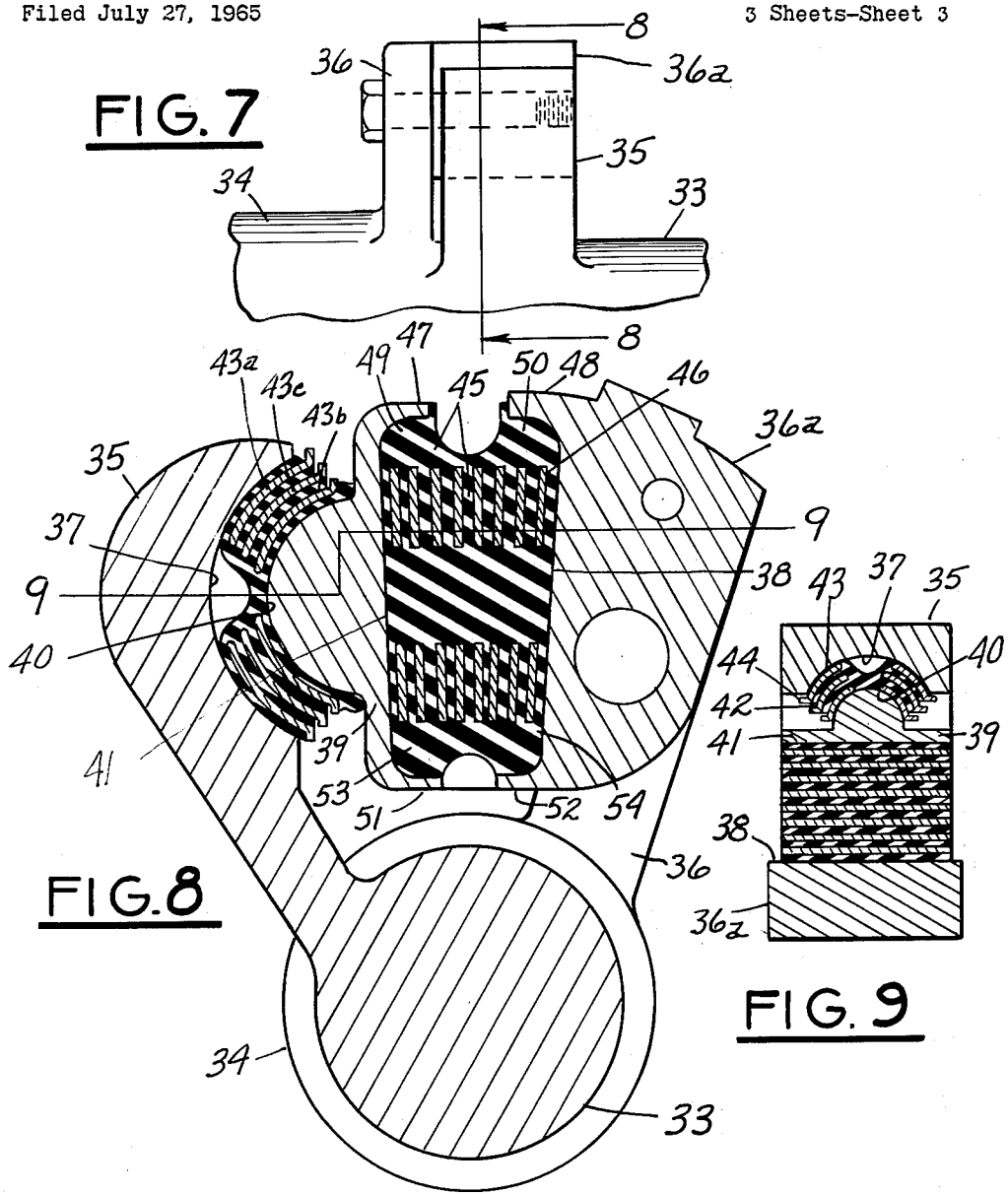

United States Patent Office 3,257,826
Patented June 28, 1966

3,257,826
FLEXIBLE COUPLING
Robert R. Peterson, Erie, Pa., assignor to Lord Corporation, Erie, Pa., a corporation of Pennsylvania
Filed July 27, 1965, Ser. No. 475,049
12 Claims. (Cl. 64—14)

This invention is a continuation-in-part of application Serial No. 303,293 filed August 20, 1963, and now abandoned.

This invention is a flexible coupling adapted to transmission of large amounts of power at high speeds. In a preferred form, the driving and driven members are connected by four or more joints each having a spherical section and a cylindrical or sandwich section centered on an axis parallel to the axis of the coupling.

Figure 1:
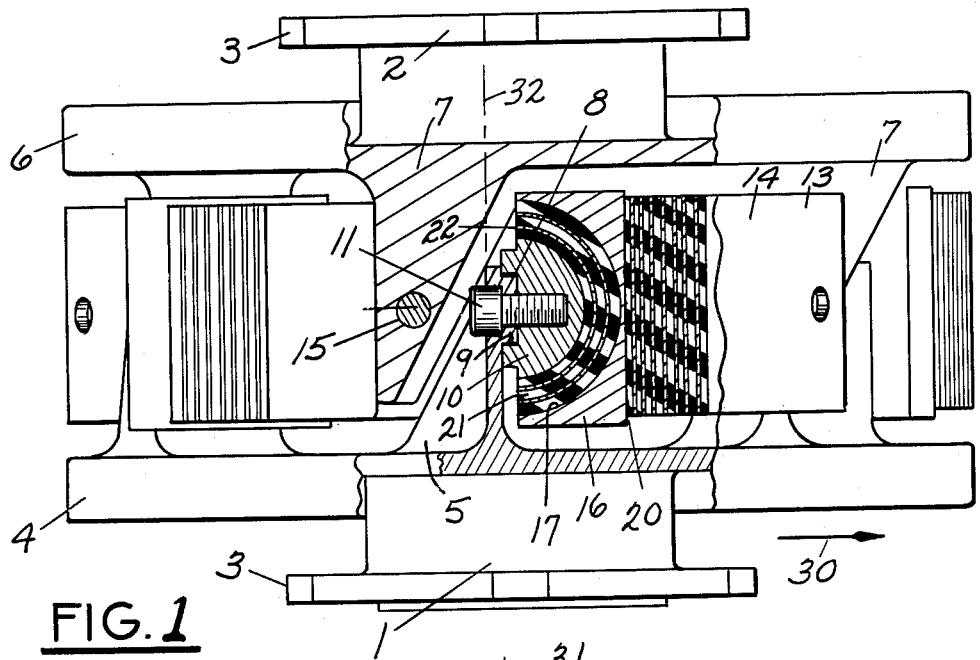
Figure 2:
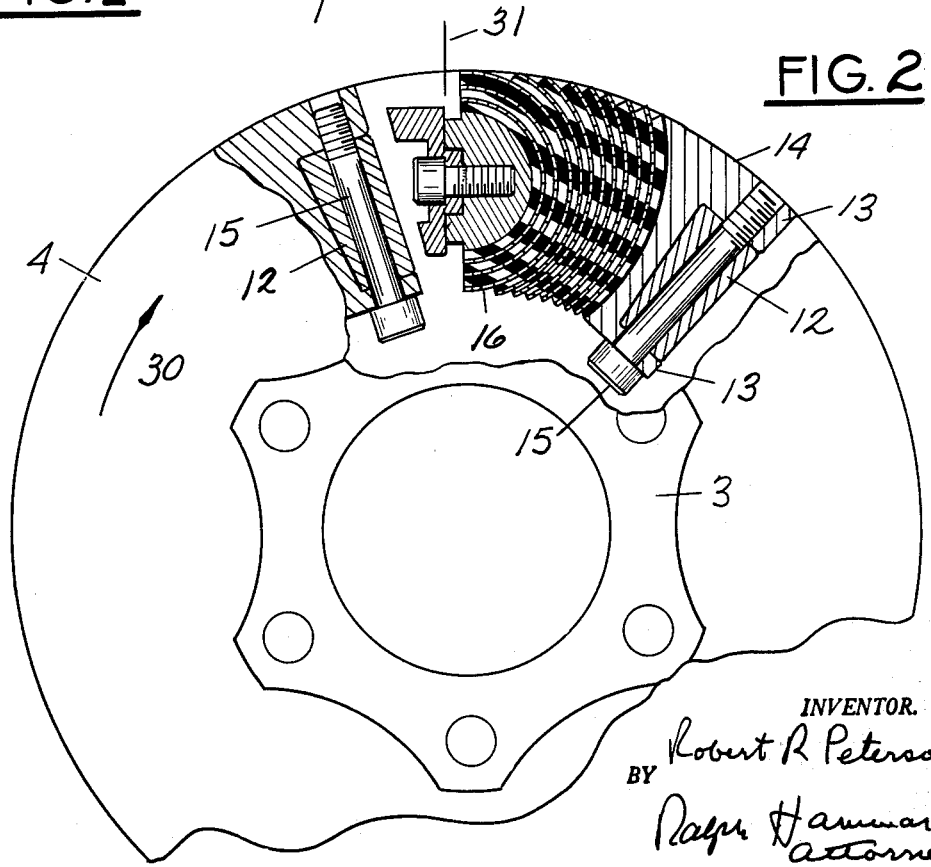

In the drawing, FIG. 1 is a plan view of a flexible coupling partly in section, FIG. 2 is an end view partly in section, FIG. 3 is an end view of one of the joint members connecting the driving and driven members, FIG. 4 is a plan view of the joint member, FIG. 5 is a section on line 5—5 of FIG. 3, FIG. 6 is a section on line 6—6 of FIG. 4, FIG. 7 is a side view of one of the associated pairs of drive fingers of a modification, FIG. 8 is a section on line 8—8 of FIG. 7, FIG. 9 is a section on line 9—9 of FIG. 8, and FIGS. 10 and 11 are end views of the driving and driven members of the modification.

In the coupling of FIGS. 1 through 6 inclusive, there are driving and driven members 1 and 2, each provided with a connecting flange 3. The member 1 has a flange 4 with two or more drive fingers 5 projecting axially toward the member 2. The member 2 has a similar flange 6 with an equal number of drive fingers 7 projecting axially toward the member 1. In the particular coupling there are six each of the drive fingers 5 and 7. The number of drive fingers is determined by the load. Any number of fingers greater than two on each member may be used.

The drive fingers 5 and 7 have circumferentially spaced load carrying sections connected by the elastomeric joint members illustrated in FIGS. 3 to 6 inclusive. Each drive finger 5 has on its load carrying section a cylindrical projection 8 fitting in a socket 9 in a semispherical metal part 10. The finger 5 and part 10 are connected by a screw 11 which prevents accidental displacement and is in the nature of a safety pin rather than a load carrying part. Each drive finger 7 has on its load carrying section a tongue 12 received between projections 13 on a metal part 14. A safety pin 15 extends through the projections 13 and tongue 12. Between the members 10 and 14 is an intermediate floating metal member 16 having a semispherical surface 17 concentric with and presented toward the semispherical surface 18 on the member 10. The semispherical surfaces 17 and 18 are centered at 19. On the opposite face of the floating member 16 is a cylindrical surface 20 parallel to the axis of rotation of the members 1 and 2 and centered on a line passing through the point 19 and extending parallel to the axis of rotation of the members 1 and 2.

Between the semispherical surfaces 17 and 18 is a body 21 of rubber or like elastomer having bonded therein a plurality of semispherical metal plates 22 spaced from each other and each centered on the point 19. The purpose of the plates 22 is to reduce bulging of the body 21 under compressive load between the spherical surfaces 17 and 18. Between the cylindrical surface 20 and a cylindrical surface 24 on a member 14 is a body 26 of rubber or like elastomer having bonded therein a plurality of cylindrical metal plates 27, likewise for the purpose of reducing bulging of the elastomer under compressive load. The cylindrical plates 27 and the cylindrical surface 24 are arranged so that the spacing between the plates at the inner edges 28 is less than the spacing at the outer edges 29. This is accomplished by shifting the center of each of the cylindrical plates 27 and of the cylindrical surface 24 outward along a radial line by an amount sufficient to obtain the required difference in spacing between the inner edges 28 and outer edges 29. The purpose of this is to equalize the load on the sections of elastomer between the plates 27.

The coupling is assembled by first mounting the members 10 on the drive fingers 5 and fastening by screws 11. The drive fingers 7 on the member 2 are then moved into position with the projections 13 straddling the tongues 12. The intermediate joint members are then placed under compression to permit insertion of the safety pins 15. When so assembled, the coupling will transmit torque from member 1 to member 2 in the direction of arrow 30 from the drive fingers 5 to the drive fingers 7. The driving torque is always transmitted in the direction to place the rubber bodies 21 and 26 under compression. Under misalignment forces, the semispherical and cylindrical sections of the joints act differently. The semispherical section of the joint shown in section at the top of FIG. 2 will accommodate rotation of the coupling about an axis 31 extending radially through point 19. So far as this direction of motion is concerned, the cylindrical section of the joint is effectively rigid due to the large number of metal shims 27 which restrict the bulging of the rubber and thereby increase its resistance to compressive strain. The cylindrical section of this particular joint is, however, effective to accommodate motion about an axis 32 extending axially through point 19. The semispherical section of the joint is rigid so far as motion about the axis 32 is concerned. Since the joints are distributed about the axis of rotation of the driving and driven members, the combined effect is to accommodate substantial angular misalignment. As an example of the compactness obtainable, the joint illustrated has an outside diameter of 7 inches, an axial length of 4½ inches and will transmit 3,000 horsepower at from 6,000 to 10,000 r.p.m. while accommodating an angular misalignment of 2 degrees.

From another aspect, the semispherical section of the joint accommodates pivotal movement in any direction about the center 19 by shear of the elastomer 21 and accommodates translation in any direction by compression of the elastomer 21. Because of the plates 22, the elastomer 21 is stiff in compression so translation between metal parts 10 and 16 is substantially prevented. This means that radial, axial and circumferential translation of the member 16 relative to the part 10 is prevented while angular motion of the member 16 relative to the part 10 is permitted in any direction about the center of the semispherical section. The cylindrical section of the joint accommodates axial translation or movement of the part 14 relative to the part 16 by shear of the elastomer 26. Angular movement of the part 14 relative to part 16 about an axis parallel to the axis of the coupling is also accommodated by shear of the elastomer 26. Radial translation from centrifugal force and circumferential translation from the driving torque are accommodated by compression. The coupling is stiff under loads from the driving torque but is relatively soft in loads from angular misalignment.

In the modification of FIGS. 7–11, there are driving and driven members 33 and 34 respectively having drive fingers 35 and 36 distributed about the axis of the coupling. The drive fingers 35 have concave spherical surfaces 37 spaced radially outward of the drive axis of the coupling and arranged transverse to the drive thrust. The drive fingers 36 are bolted to blocks 36a having generally flat surfaces 38 also spaced radially outward of and extending radially and axially with respect to the axis of the coupling. The surfaces 37 and 38 are associated in pairs and extending tangentially in thrust transmitting relation between each pair is a joint having an intermediate member 39 having on one end a convex spherical surface 40 spaced from and presented to the concave surface 37 and having on the other side a generally flat surface 41 spaced from and presented toward the flat surface 38 and extending radially and axially with respect to the axis of the coupling. Preferably the spherical surfaces 37 and 40 are concentric. Between the spherical surfaces is a body 42 of elastomer bonded or otherwise fixed to the surfaces and having spaced spherical metal shims 43 bonded therein for preventing bulging of the elastomer under compression load. The embedded shims 43 have rims 44 which project outwardly beyond the elastomer 42.

It will be noted that the spherical surfaces 37 and 40 and the intermediate shims 43a, 43b and 43c are nested and form in effect a ball and socket joint which accommodates pivotal movement in all directions by shear of the intervening elastomer but which is rigid in both axial and radial translation where the elastomer is stressed in compression. This means that there can be relative pivotal movement between the fingers 35 and the intermediate member 39 but the intermediate member 39 is prevented from moving either axially or radially with respect to the finger 35.

Between the surfaces 38 and 41 is a body 45 of elastomer having bonded therein a plurality of radially extending metal or nonextensible shims 46 closely spaced from each other. The purpose of the shims 46 is to prevent bulging of the elastomer 45 under compressive load. In order to prevent radial motion of the elastomer 45 under compressive load, each intermediate member 39 and the associated finger 36 has axially extending flanges 47 and 48 overlapping the outer surface of the body of elastomer. The flanges 47 and 48 diverge from the elastomer 45, providing generally wedge shaped sections 49 and 50 between the flanges and the outer edges of the shims 46. On the inner edges of the intermediate member 39 and finger 36 are similar flanges 51 and 52 which overlap the inner surface of the body 45 of elastomer and provide generally wedge shape spaces 53 and 54 between the flanges and the inner edges of the shims 46. The purpose of the flanges 47 and 48 is to prevent radially outward movement of the elastomer 45 under centrifugal loads. The flanges are effective in this respect because the elastomer is trapped by the flanges and is stressed in compression by the centrifugal load. The flanges 47, 48, 51 and 52 have the additional function of increasing the stability of the elastomer 45 under compressive load by decreasing the length to width ratio. For the purpose of load, the effective length of the body 45 of elastomer is the spacing between the surfaces 38 and 41. For the purpose of column stability, the effective length of the body 45 is the spacing between the flanges 51, 52 and 47, 48. The close spacing of the flanges provides an extremely stable condition under compressive load.

While the joint section between the finger 36 and the intermediate member 39 is quite stiff radially, it is soft axially where the relative motion between the finger 36 and the intermediate member 39 is generally parallel to the surfaces 38, 41 and the shims 46. In this direction, the elastomer is stressed in shear where it is relatively soft.

In operation, angular misalignment between the driving and driven members 33, 34 is accommodated by pivotal movement of the intermediate member 39 relative to the fingers 35 and by axial movement of the member 39 relative to the fingers 36. Parallel misalignment of the driving and driven members is accommodated by radial movement of the intermediate members 39 relative to the fingers 36. This radial movement is limited because the flanges 47 and 48 in conjunction with the shims 46 make the elastomer quite stiff in radial directions.

From one aspect, the cylindrical surfaces 24, 26 and the flanges such as 47, 48 increase the shear stiffness of the associated section of the joint in radial directions without affecting the shear stiffness in axial directions by causing the elastomer to be stressed partly in compression in the radial direction.

What is claimed as new is:

1. A flexible coupling comprising driving and driven members each having a plurality of angularly spaced fingers distributed about the torque axis of the coupling, the fingers of said members being associated in pairs with each pair comprising a finger of one member and a circumferentially spaced finger of the other member, a joint between each pair for transmitting the driving thrust, each joint being spaced radially outward from the axis of the coupling and extending tangentially in thrust transmitting relation between the fingers of the associated pair, each joint comprising a first section having a convex spherical surface opposed to and interfitting a concave spherical surface transverse to the driving thrust, a second section having circumferentially spaced surfaces transverse to the driving thrust and extending axially and radially with respect to the torque axis, and an intermediate member interconnecting the first and second sections of the joint, a first body of elastomer sandwiched between and fixed to the spherical surfaces of the first section of the joint, a second body of elastomer sandwiched between and fixed to the surfaces of the second section of the joint whereby relative motion of the fingers due to misalignment of the driving and driven members is accommodated by relative edgewise movement of said surfaces and by shear of the bodies of elastomer between said surfaces.

2. The coupling of claim 1 in which the first body of elastomer has embedded therein a plurality of spherical shims for resisting bulging of the elastomer.

3. The coupling of claim 1 in which the bodies of elastomer have embedded therein inextensible members for resisting bulging of the elastomer.

4. The coupling of claim 1 in which the second section of the joint has means for resisting the shear of the elastomer in radial translation.

5. The coupling of claim 4 in which the means for resisting shear of the elastomer in radial translation comprises cylindrical contours on the surfaces of the second section centered on a axially extending axis.

6. The coupling of claim 4 in which the means for resisting shear of the elastomer in radial translation comprises circumferentially extending flanges overlapping the elastomer between the surfaces of the second section and blocking radially outward movement of the elastomer.

7. The coupling of claim 1 in which the body of elastomer between the surfaces of the second section has radially and axially extending shims embedded therein for resisting bulging of the elastomer.

8. A flexible coupling comprising axially spaced driving and driven members each having a plurality of angularly spaced fingers, the fingers of said members being associated in pairs with each pair comprising a finger on one member and a circumferentially spaced finger on the other member, a joint between each pair comprising a first member connected to one finger of each pair, a second member connected to the other finger of each pair and an intermediate member between said first and second members, said first member and said intermediate member having opposed spherical surfaces and a body of elastomer bonded to and in load carrying relation between said surfaces, said body having bonded therein a plurality of spherical shims for resisting bulging of the elastomer, said second member and said intermediate member having opposed cylindrical surfaces substantially concentric with an axis parallel to the axis of the coupling and extending through the center of said spherical surfaces, and a body of elastomer bonded to and in load carrying relation between said cylindrical surfaces, said body having bonded therein a plurality of cylindrical shims resisting bulging of the elastomer.

9. A flexible coupling comprising driving and driven members each having an plurality of angularly spaced fingers, the fingers of said members being associated in pairs with each pair comprising a finger on one member and a circumferentially spaced finger on the other member a joint between each pair comprising a first member connected to one finger of each pair, a second member connected to the other finger of each pair and an intermediate member between said first and second members, said first member and said intermediate member having opposed spherical surfaces and a body of elastomer bonded to and in load carrying relation between said surfaces, said second member and said intermediate member having opposed cylindrical surfaces substantially concentric with an axis parallel to the axis of the coupling and extending through the center of said spherical surfaces, and a body of elastomer bonded to and in load carrying relation between said cylindrical surfaces.

10. A flexible coupling comprising driving and driven members each having a plurality of drive fingers distributed about the axis of the coupling, each finger having a load carrying section spaced radially outward from the axis of the coupling and the load carrying sections of the fingers of the driving and driven members being circumferentially spaced from each other, a plurality of joints arranged between the load carrying sections of the driving and driven members, each joint having a part in load carrying relation to the load carrying section of one of the members and another part in load carrying relation to the load carrying section of the other of the members, said parts having opposed semispherical surfaces centered radially outward from the axis of the coupling, and a body of elastomer bonded to and between said surfaces, said body having bonded therein a plurality of semispherical shims for resisting bulging of its elastomer.

11. A flexible coupling comprising driving and driven members each having joints spaced radially outward from the axis of the coupling, each joint comprising a first section having opposed spherical surfaces and a first body of elastomer bonded to and in thrust relation between said surfaces and placed under compression by the driving torque, a second section having opposed cylindrical surfaces at right angles to said first section and a second body of elastomer bonded to and in thrust relation between said cylindrical surfaces and placed under compression by the driving torque, and an intermediate member interconnecting said sections, said first body having bonded therein a plurality of spherical shims for resisting bulging of the elastomer.

12. A flexible coupling comprising driving and driven members each having joints spaced radially outward from the axis of the coupling, each joint comprising a first section having opposed spherical surfaces, a second section having opposed cylindrical surfaces at right angles to said first section, and an intermediate member interconnecting said sections, and a body of elastomer bonded to and in thrust relation between said opposed surfaces of each of the first and second sections of the joint and placed under compression by the driving torque.

References Cited by the Examiner

UNITED STATES PATENTS

| | | | |
|---|---|---|---|
| 1,668,134 | 5/1928 | Wilson | 64—14 |
| 2,752,766 | 7/1956 | Wildhaber | 64—11 |
| 2,760,359 | 8/1956 | Wildhaber | 64—11 X |
| 2,995,907 | 8/1961 | Orain | 64—11 |

BROUGHTON G. DURHAM, *Primary Examiner.*

H. C. COE, *Assistant Examiner.*